(12) United States Patent
Kageler et al.

(10) Patent No.: US 7,456,608 B2
(45) Date of Patent: Nov. 25, 2008

(54) BATTERY-DRIVEN SCREWDRIVER

(75) Inventors: Sven Kageler, Leinfelden-Echterdingen (DE); Ginn Yuh Gan, Penang (MY); Abdul Aziz Zulfikar, Penang (MY)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/550,714

(22) PCT Filed: Jul. 24, 2004

(86) PCT No.: PCT/DE2004/001657

§ 371 (c)(1),
(2), (4) Date: Sep. 21, 2005

(87) PCT Pub. No.: WO2005/039833

PCT Pub. Date: May 6, 2005

(65) Prior Publication Data

US 2006/0192527 A1 Aug. 31, 2006

(30) Foreign Application Priority Data

Sep. 29, 2003 (DE) ................. 103 45 135

(51) Int. Cl.
*H02J 7/00* (2006.01)
(52) U.S. Cl. ........................... 320/114; 307/64
(58) Field of Classification Search ............... 320/114; 307/64
See application file for complete search history.

(56) References Cited

U.S. PATENT DOCUMENTS

| | | | |
|---|---|---|---|
| 3,369,615 A | 2/1968 | Maffey | |
| 3,659,180 A | 4/1972 | Urbush | |
| 4,493,223 A | 1/1985 | Kishi et al. | |
| 4,739,242 A | 4/1988 | McCarty et al. | |
| 4,751,452 A | 6/1988 | Kilmer et al. | |
| 4,835,410 A * | 5/1989 | Bhagwat et al. | 307/64 |
| 4,983,080 A * | 1/1991 | Somers et al. | 408/241 R |
| 5,054,563 A | 10/1991 | Zapf | |
| 6,106,971 A | 8/2000 | Spotnitz | |
| RE37,092 E | 3/2001 | Sharrah et al. | |
| 6,229,280 B1 * | 5/2001 | Sakoh et al. | 320/106 |
| 6,566,843 B2 * | 5/2003 | Takano et al. | 320/114 |

(Continued)

FOREIGN PATENT DOCUMENTS

CN 2569354 8/2003

(Continued)

*Primary Examiner*—Gary L Laxton
*Assistant Examiner*—Yalkew Fantu
(74) *Attorney, Agent, or Firm*—Michael J. Striker

(57) ABSTRACT

A cordless screwdriver having a housing (12, 18), having a handle (14), in particular one that is angled in pistol fashion, having a preferably permanently installed rechargeable battery (40), having charging contact tabs (37) for charging the rechargeable battery (40), and having an output spindle (20) is always ready for use and can be picked up quickly because it has a lithium-ion (Li-ion) cell as its rechargeable battery (40) and can be placed onto a charging cradle (22) for an unlimited amount of time, in particular during pauses between uses; the charging mode is automatically initiated and in it, the cordless screwdriver (40), with regard to its output spindle (20), is positioned on the charging cradle (22) so that it is inclined, in particular by approximately 30-45°, in relation to the perpendicular and the end of the output spindle (20) points downward.

18 Claims, 10 Drawing Sheets

U.S. PATENT DOCUMENTS

| | | |
|---|---|---|
| D476,542 S | 7/2003 | Chunn et al. |
| 6,776,069 B2 | 8/2004 | Soreo et al. |
| 6,817,424 B1 | 11/2004 | Su et al. |
| 7,197,961 B2 * | 4/2007 | Kageler et al. ............... 81/52 |
| 2002/0153863 A1 | 10/2002 | Arndt |
| 2003/0094294 A1 | 5/2003 | Fritz |

FOREIGN PATENT DOCUMENTS

| | | |
|---|---|---|
| DE | 90 14 132.6 | 2/1991 |
| DE | 92 06 493.0 | 8/1992 |
| EP | 1 253 673 A2 | 10/2002 |
| EP | 1 266 725 | 12/2002 |
| EP | 1 066 930 B1 | 3/2004 |
| JP | 09047982 A2 | 2/1997 |

* cited by examiner

BATTERY-DRIVEN SCREWDRIVER

CROSS-REFERENCE TO A RELATED APPLICATION

The invention described and claimed hereinbelow is also described in German Patent Application DE 103 45 135.8 filed on Sep 29, 2003. This German Patent Application, whose subject matter is incorporated here by reference, provides the basis for a claim of priority of invention under 35 U.S.C. 119(a)-(d).

BACKGROUND OF THE INVENTION

The present invention relates to a cordless screwdriver.

Cordless screwdrivers in the output class between 2.4V and 3.6V are already known, e.g. from EP 1 066 930. For the most part, they have several NiCd cells as energy storage devices, an on/off switch with a short contact button and without stepless speed control, a switch for changing between clockwise and counterclockwise rotation, a transmission that reduces the motor speed, in particular a sun-and-planet gear, and a motor with a standard diameter of 27.5 mm. There are rod-shaped and pistol-shaped designs and there are designs that have a handle with an adjustable inclination angle. These devices are either recharged by being connected to the charging unit by means of a plug —similar to a mobile phone or shaver—or are recharged by means of a cradle with contacts into which the device is placed. The cradles can be attached to a wall, for example, in order to facilitate recharging.

To this end, the charging mode must first be initiated for the charging unit and the electrical connection, but this does not occur automatically after each use. As a result, the device is often not ready for use right when it is needed, in addition to the disadvantageous impact of the known memory effect. After a certain amount of time without outputting power, NiCd cells become discharged and even when they are not used, cordless drills are partially discharged after a short period of time. If they are recharged when they are only partially discharged, then the memory effect causes them to have only the difference of the new charge quantity after the recharging process—consequently leaving them with only a reduced amount of available power.

Another disadvantage of the known cordless screwdriver is its voluminous size due to its large components, e.g. the transmission, the switch system, and the rechargeable battery comprised of NiCd cells whose size "4/5 Sub-C" when they are situated in the handle interferes with both ergonomics and usability because narrow, angled screw locations cannot be reached.

SUMMARY OF THE INVENTION

Accordingly, it is an object of the present invention to provide a cordless screwdriver which eliminates the disadvantages of the prior art.

In keeping with these objects and with others which will become apparent hereinafter, one feature of the present invention resides, briefly stated, in a cordless screwdriver, comprising a housing; a handle; a rechargeable battery formed as a lithium-ion cell; charging contact tabs for charging said rechargeable battery; and an output spindle, the cordless screwdriver as a whole being placeable onto a charging cradle which automatically initiates a charging mode and in the charging mode being positioned on the charging cradle so that with regard to said output spindle it is inclined and an end of said output spindle points downwards.

When the cordless screwdriver is designed in accordance with the present invention, it has the advantage that it can always be quickly and safely picked up in the same place, with a fully available charge capacity, while being inexpensive to manufacture as well as extremely lightweight and handy.

Since the lithium-ion cell experiences hardly any self-discharging, the cordless screwdriver is fully ready for use even after long pauses between uses; during long pauses between uses, the cordless screwdriver can remain in the charging mode on the charging cradle for any amount of time. The charging cradle can be placed in a stable fashion on a flat supporting surface, without having to be mounted in place, and without having to be held when the cordless screwdriver is removed. It is therefore always ready to be picked up with only one hand, without having to remove a plug or release a catch. In addition, the cordless screwdriver is automatically assured of being fully charged at any time.

The compact lithium-ion cell is clamped without play in stationary fashion inside the handle region of the casing half; two welded contact tabs with electrical supply lines in its end regions are soldered to the circuit board. The cell is integrated into the reinforcing structure of the handle and increases its inherent stability while minimizing materials consumption for the casing halves of the housing.

The circuit board provided for control purposes is the mounting board for the switch-on contacts, the charging contact tabs, the slide switch for reversing directions, the two light-emitting diodes for indicating the rotation direction, and the means for controlling the charging and discharging current of the lithium-ion cell. The circuit board is also situated lengthwise inside the handle, functioning as an additional transverse rib in the reinforcing structure of the housing and/or the handle, significantly increasing its bending strength.

In lieu of a box-like on/off switch, which is standard for this class and has one position each for clockwise rotation and counterclockwise operation, the concept of a separate preselection for clockwise/counterclockwise operation has been adopted. Whereas in drill/drivers of the prior art, a separate assembly for this purpose is mounted onto the box-like main switch, in this instance, a simple and inexpensive slide switch that is soldered to the circuit board and is, for example, a mass-produced component available on the electronics market, can be manually controlled by means of the usual slider, thus providing a simply designed reversing of the rotation direction.

The charging contact tabs soldered to the circuit board protrude through openings in the lower end of the handle and in the charge position, are contacted by counterpart contacts of the charging cradle, without having to connect any additional cable or plug connector.

Depending on the rotation direction of the motor, a green or red light-emitting diode soldered to the circuit board lights up. These LEDs are visible from the outside through openings in the housing covered by a transparent plastic part serving as a window.

The use of only a single long, slender lithium-ion cell permanently built into the handle of the cordless screwdriver as the rechargeable battery instead of a number of 4/5 Sub-C nickel cadmium cells makes it possible to achieve a particularly small handle circumference. A significantly reduced, extremely maneuverable size in a "slimline revolver" format is also achieved by replacing the usual box-like switch component with a contact plate, which takes up only 10% of the former's volume and is connected to the on/off button; this contact plate electrically connects two counterpart contacts to each other when the button is slid. The contact plate here is screw connected to the on/off button.

Two relatively large, hard coil springs keep the on/off button preloaded into its off position and, through rapid opening and closing of the contacts, prevent them from becoming welded to the contact plate by their high impedance, which increases over their service life.

The long on/off button has a short actuation stroke and can be actuated with particular ease to reliably switch on in any position. Regardless of the actuation position, only slight actuating forces are required and the device can be switched on conveniently in virtually any position of the operating hand. In order to improve the guidance of the on/off button in relation to the housing, it has two lateral guide tabs on the inside that are supported in sliding fashion in the housing.

Further volume reduction of the cordless screwdriver is achieved through the compact design of the transmission and transmission housing; the transmission in the form of a sun-and-planet gear is simply inserted into the cylindrical transmission housing and prevented from falling out by an axial securing plate; in addition, the transmission housing is provided with an internal gearing and, itself, serves as the sun gear.

Providing the motor shaft end oriented toward the transmission with a flattened region and providing the corresponding engagement opening of the transmission input shaft with the corresponding negative shape achieves a simple, easy-to-assemble, compact coupling between the motor and transmission, which also permits loose tolerances and functions in a reliable manner as well.

Because the motor housing is composed of casing halves divided down the middle, which embrace the transmission housing from both sides in clamp fashion with inwardly protruding supporting tabs and hold it centered in the mounting position, the transmission housing is precisely and reliably attached to the motor housing without the use of separate fastening elements such as screws or detent elements.

Further weight and volume reduction of the cordless screwdriver are achieved by eliminating a chuck; a hex socket of the output shaft—which fits corresponding screwdriver or drill bits with hexagonal shafts—permits these tools to be quickly and easily changed.

An on/off button and rotation direction reversing switch are embodied so that on the one hand, when the on/off button is pressed, the rotation direction reversing switch is locked and cannot be moved and on the other hand, when the rotation direction reversing switch is in the middle position, the recommended transport position, the on/off button is locked and cannot be pushed into the on position.

At the same time, the transmission housing serves as the outer gear of the sun-and-planet gear. This eliminates an additional component and makes the device slim and compact, with a small width across corners (spindle axis to the outer contour). The tooth cross sections and tooth heights of the outer gear of the sun-and-planet gear (transmission housing) simultaneously constitute the stop for a retaining washer that serves as an axial securing device and constitutes the motor-side limitation of the planet gears of the first stage. The retaining washer has two wings protruding from its circumference, which can engage in bayonet locking fashion in two corresponding recesses of the transmission housing and can be rotated into an adjacent annular groove to prevent it from coming loose in the axial direction. This washer simultaneously serves as a transport securing device for the transmission, which can be supplied separately. In the installed state, the washer is secured between the motor and the transmission housing by means of its wings. It is also possible to use a retaining washer with protruding, bent wings that can be secured in the recesses by being press-fitted into them.

The sun-and-planet gear is provided with an autolock system, i.e. with a spindle that automatically locks when it is rotated from the outside through the exertion of force. Its transmission housing, on the motor side at the top and bottom, has axial extensions with an annular groove and an annular bead. The annular beads of the casing halves, which have correspondingly opposing profiles, engage in this annular groove. The transmission housing is thus engaged and axially secured without the need for additional components such as screws, rivets, or detent projections. Axial counterpart extensions on the casing halves protrude laterally into the recesses in the transmission between these extensions. This placement serves to prevent the transmission housing from rotating in relation to the motor housing—without requiring the use of separate components. The axial extensions are asymmetrical so that there is only one way to assemble them.

The transmission housing, the circuit board with the rechargeable battery, the motor, the light-emitting diodes and electrical elements, the switch button with the contact plate and springs, and the transparent plastic part are inserted into a first casing half, enclosed by the second casing half secured with only four identical screws, and thus completely assembled, yielding a very inexpensive design.

The very compact design makes it possible to hold the device at the front of the transmission housing and/or on the adjoining motor housing in one hand so that the index finger of this hand can hold a screw against the bit while the remaining fingers can easily operate the large-area on/off button and the free hand can hold the work piece.

The large-area rubber covering with a nubbed surface extending over the entire grip region allows the cordless screwdriver to rest in the operating hand with a particularly secure grip.

An exemplary embodiment of the present invention will be explained in detail below in conjunction with the accompanying drawings.

DESCRIPTION OF THE PREFERRED EMBODIMENTS

Figure 1:
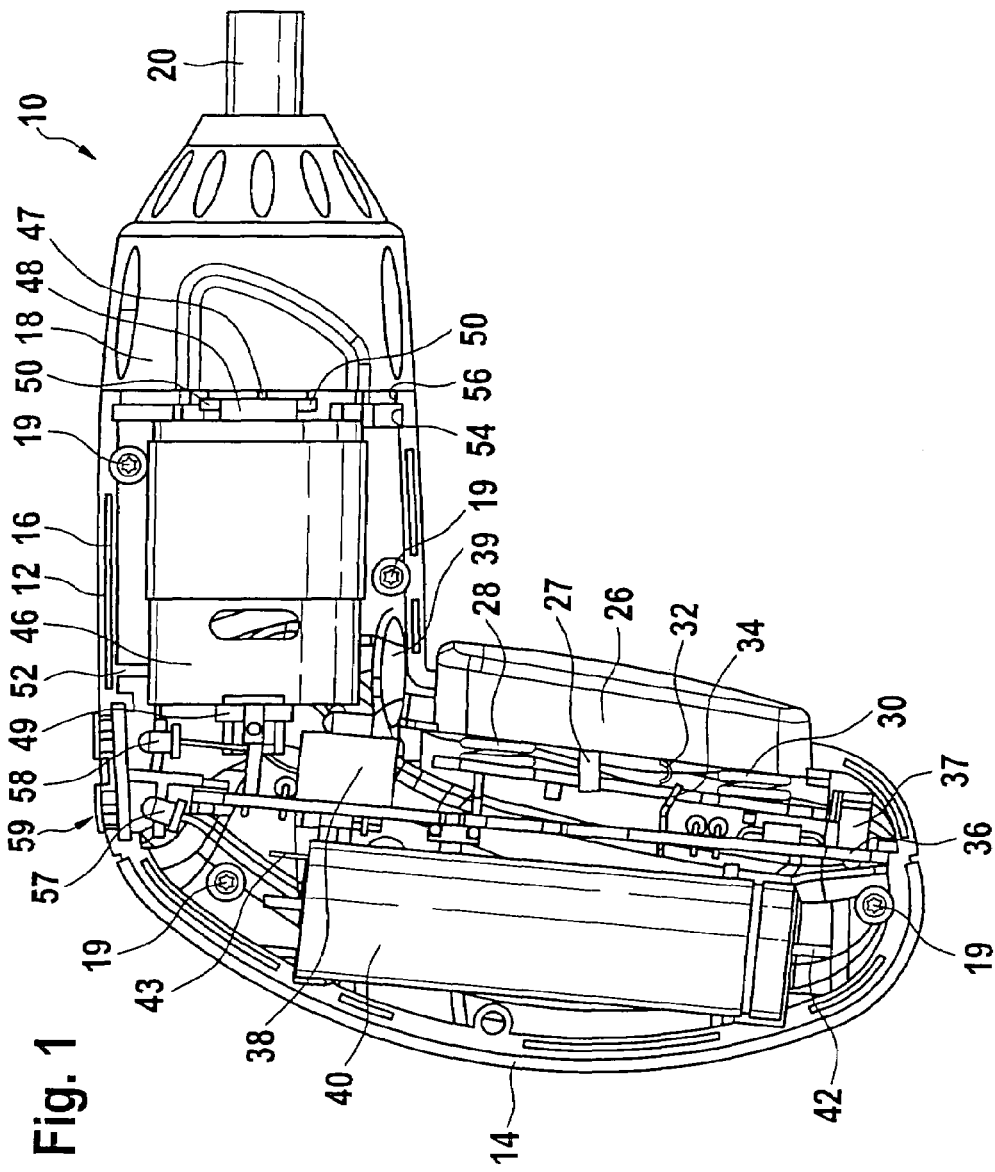
FIG. 1 is a side view of the partly open cordless screwdriver.
Figure 2:
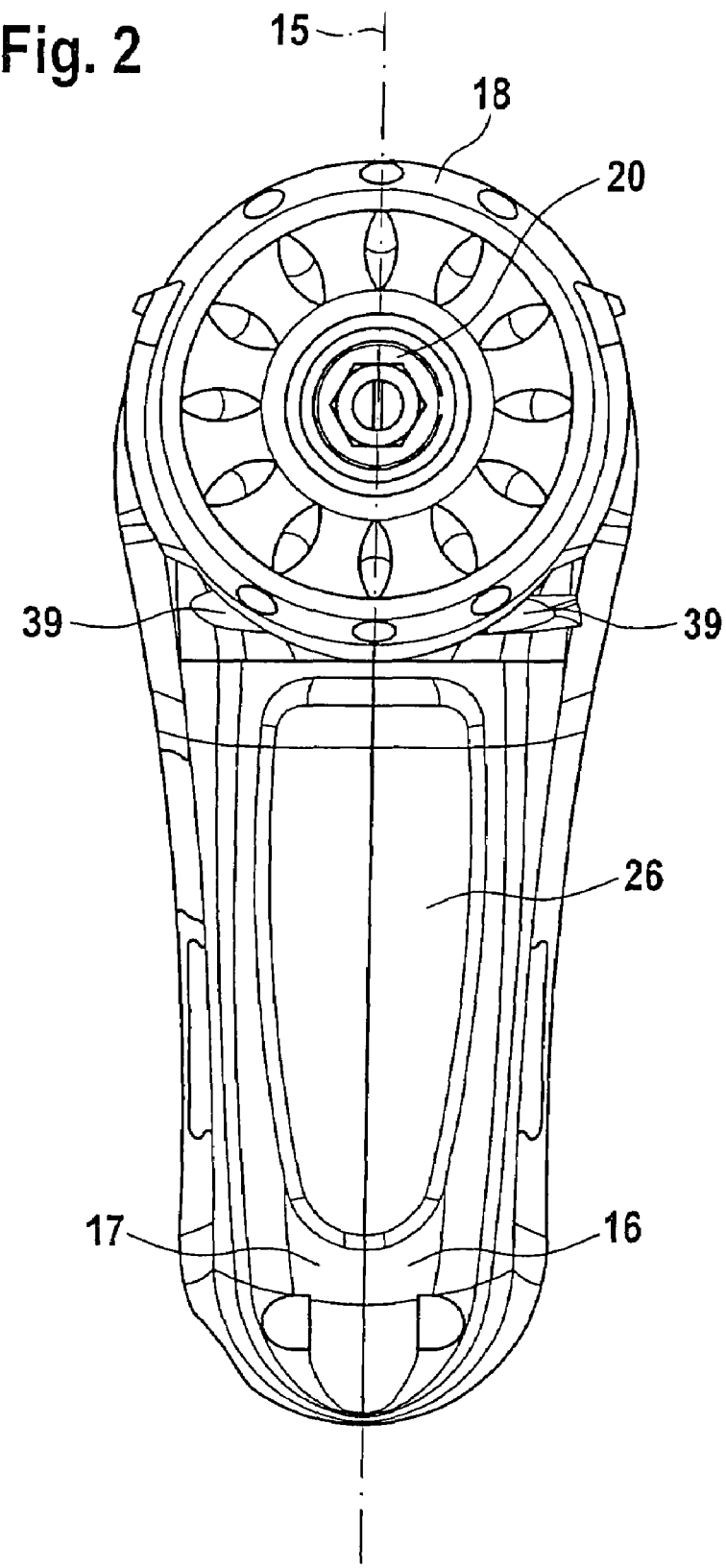
FIG. 2 is a front view of the cordless screwdriver.

FIG. 1 shows a pistol-like cordless screwdriver 10 with a motor housing 12 that is aligned with the screwdriving direction and a handle 12 situated at an angle thereto. The motor housing 12 with the handle 14 is comprised of two casing halves 16, 17 that can be snugly joined to each other along a central plane 15. To this end, four screws are inserted through bores in the one casing half 17 and engage in four screw mounts 19 in the other casing half 16, thus attaching the two halves to each other.

An on/off button 26 is provided, which extends over almost the entire inner length of the handle 14. The on/off button 26 with a screw-connected contact plate 32 cooperates with the counterpart contacts 34 affixed to the machine, thus constituting an on/off switch for the machine and eliminating the need for a separate, box-shaped standard switch or button of the kind usually provided in the trade. The particular length of the on/off button 26 makes it easy to switch on and off, even when the cordless screwdriver 10 is being held in difficult positions. Its longitudinal sides are provided with supporting tabs 27 that protrude laterally into the handle 14, constituting a secure guidance along corresponding counterpart surfaces in the casing halves 16, 17 and permitting a precise, play-free back-and-forth motion.

Two hard compression springs 28, 30 elastically support the on-off button 26 on the handle 14 so that after the screwdriver is switched on, as soon as the on/off button 26 is released, the springs 28, 30 automatically guide it back to its off position, separate the contacts 32, 34, and stop the movement of the motor. The actuation stroke is delimited by stops, not shown in detail, and is very short and user-friendly when it is 1 to 4 mm long.

To accommodate entry of the on/off button 26 into the motor housing 12, a corresponding opening 29 situated halfway in each of the casing halves 16, 17, which tightly encloses the on/off button 26 so that it is guided as though in a slot. On its top and bottom ends oriented toward the handle 14, the on/off button 26 has respective longitudinally extending tabs that protrude beyond the opening 29 and are supported against the inside along the edge of the opening, thus holding the on/off button 26 against these opening edges in the off position and preventing it from coming out of the housing 12.

The counterpart contacts 34 associated with the contact plate 32 are situated on an oblong circuit board 36 extending inside the handle 14, opposite from the contact plate 32 and within its movement range. The circuit board 36 also has two symmetrically situated charging contact tabs 37 that protrude out from the plane of the circuit board 36 at right angles and then each form large contact surfaces that are bent outward at the end. These large contact surfaces extend through each of the two casing halves 16, 17 symmetrical to the central plane 15 at the lower end of the handle 14. As a result, they are embedded in a "recessed" position within the handle contour and are accessible to the outwardly protruding charging contacts 23 of the charging cradle 22, which, due to their resilient design, overlap the charging contact tabs 37 in the charging state when the screwdriver is resting on the charging cradle 22.

The circuit board 36 also has flat, close-to-the-surface interference resistors and capacitors, not shown in detail, approximately in the middle, has the slide switch 38 in the upper region, and has two light-emitting diodes 57, 58 at the upper end for visually indicating the rotation direction.

The circuit board 36 is situated with its long side parallel to the handle 14 and its short end oriented transversely in relation to the central plane 15 and is clamped without play in groove-like recesses, not shown in detail, in both of the casing halves 16, 17 so that it rests against the casing halves 16, 17 from the inside and thus constitutes a reinforcing rib in the handle 14. Parallel to the circuit board 36, a lithium-ion cell with the known advantages is accommodated in the handle 14 as the rechargeable battery 40, is embraced and secured in position in clamp fashion by the two casing halves 16, 17, and is thus integrated into the reinforcing structure of the housing 12. The rechargeable battery 40 has a contact plate 42, 43 at the top and bottom; these contacting plates serve as soldering tags and are wired to the circuit board 36.

Above the on/off button 26 at the join between the inclined handle 14 and the motor housing 12, a sliding pushbutton 39 is situated so that it can be slid back and forth transversely in relation to the central plane 15 of the motor housing 12 through lateral openings, not shown, in the casing halves 16, 17. By means of a recess approximately in the center, not shown, the sliding pushbutton 39 functions like a fork embracing a slide mechanism 41 of a box-like slide switch 38 affixed in the upper region of the circuit board 36. The sliding pushbutton 39 can be used to move the slide mechanism 41, which is placed against the slide switch 38, into the lateral positions furthest to the left and right and into a middle position.

Once installed, a DC motor 46 in the front region of the motor housing 12 is embraced in clamp fashion by the casing halves 16, 17 and is held without play in its operating position, parallel to the transmission housing 18 inserted into the motor housing 12. At the front and rear, the motor 46 has a step-like motor collar 48, 49 from which the front and rear ends of the motor shaft 45 protrude. The motor 46 is supported in a centered fashion, with its front and rear motor collars 48, 49 resting on corresponding pedestal-like ribs of the casing halves 16, 17. The front end 47 of the motor shaft 45 is provided with a flattened area or a dihedron, in particular is shaped into this form, and with it, engages a correspondingly flattened opening in an input pinion 66 of the transmission 65 contained in the transmission housing 18, which is embodied in the form of a sun-and-planet gear. This creates a nonpositive, frictionally engaging coupling that has a loose tolerance and is easy to assemble; the motor 46 can be easily slid together with the transmission 65 and the transmission housing 18 and in this preassembled state, inserted into one of the casing halves 16, 17 for further assembly.

At the end, a transmission housing 18 provided in the form of a separate cylindrical subassembly is embraced by the two casing halves 16, 17 without play in a clamp-like, form-locked fashion. In two tab-like partially cylindrical extensions 60 extending axially in relation to the motor housing 12, this transmission housing 18 contains an annular housing groove 54 delimited by an annular bead 55. The annular bead 55 engages in a matching counterpart annular groove 56 on the inside at the ends of the casing halves 16, 17 of the motor housing 12; matching counterpart annular grooves 53 of the casing halves 16, 17 engage in a form-locked manner in the annular housing groove 54 of the transmission housing 18.

In a way that prevents incorrect assembly, the two asymmetrical recesses between the two extensions 60 of the transmission housing 18 are engaged without play by counterpart extensions 61 that are bent transversely in relation to the longitudinal direction of the motor housing 12 and simultaneously support the motor collar 58 of the motor 46 in pedestal fashion so that it, too, is integrated into the reinforcing structure of the motor housing 12. Separate fastening elements such as screws or the like are not required. This simplifies assembly by reducing the number of separate parts.

At the top rear, the motor housing 12 contains an inserted transparent window 59, which extends longitudinally in the dividing plane and is split down the middle. Two openings in the casing halves 16, 17 permit a blue and a red light-emitting diode 57, 58 to be seen, each associated with a rotation direction of the motor shaft 45 and designed to light up when rotation occurs in the associated direction.

From the front of the transmission housing 18, which tapers to a rounded cone at the front, protrudes an output spindle 20, which is embodied at its end in the form of a hex socket 21 to accommodate matching standard bits. The hex socket 21 is provided with means that prevent an inserted screwdriver bit or drill bit from falling out so that a certain resistance must be overcome by hand in order to remove them in the axial direction.

Figure 3:
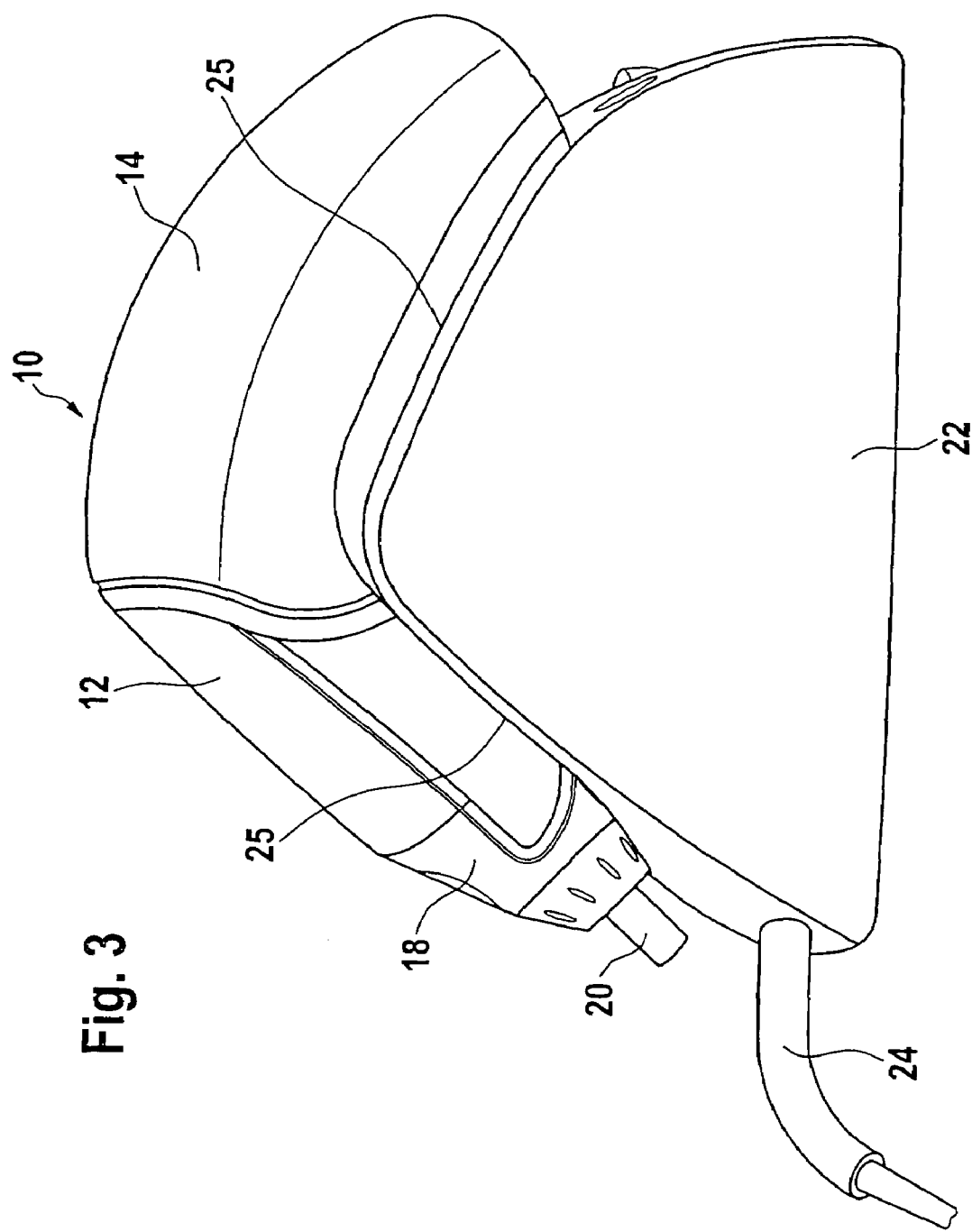
FIG. 3 is a side view of the cordless screwdriver placed in a charging cradle.

FIG. 3 shows a relatively slender, box-shaped charging cradle 22 whose outer contour is embodied with inclined surfaces to match those of the pistol-shaped inner and/or outer contour of the cordless screwdriver 10 and has a groove-like recess. This allows the inside of the cordless screwdriver 10 to be inserted without play into matching beds 25 for the handle 14, the motor housing 12, and the transmission housing 18 and to rest securely by means of its own weight, producing a particularly reliable contact between the charging contact tabs 38 and the charging contacts 23 of the charging cradle 22.

The charging contacts 23 protrude from the contour of the charging cradle 23 so that the handle 14 of the cordless screwdriver 10 engages in a corresponding recess in the charging cradle 12 and in so doing, the dead weight of the tool is supported by means of its charging contact tabs 38 against the resilient charging contacts 23 of the charging cradle 22. Merely placing the cordless drill 10 onto the charging cradle 22 immediately initiates the charging state with an audible click.

The charging cradle 22 has an electrical plug contact, not shown in detail, situated on the left in the viewing direction and designed for insertion of an electric connecting cable 24 to supply power to the charging cradle 22, which in the rear region associated with the handle 14 of the cordless screwdriver 10, has a charging control light and a vertical insertion opening 73 to hold a screwdriver bit or drill bit.

The cordless screwdriver 10 rests with its inside, in particular with its on/off button 26, against the top of a charging cradle 22 and automatically assumes a secure charging position when resting there, provided that the charging cradle 22 is connected to an appropriate power supply via the cable 24.

Figure 4:
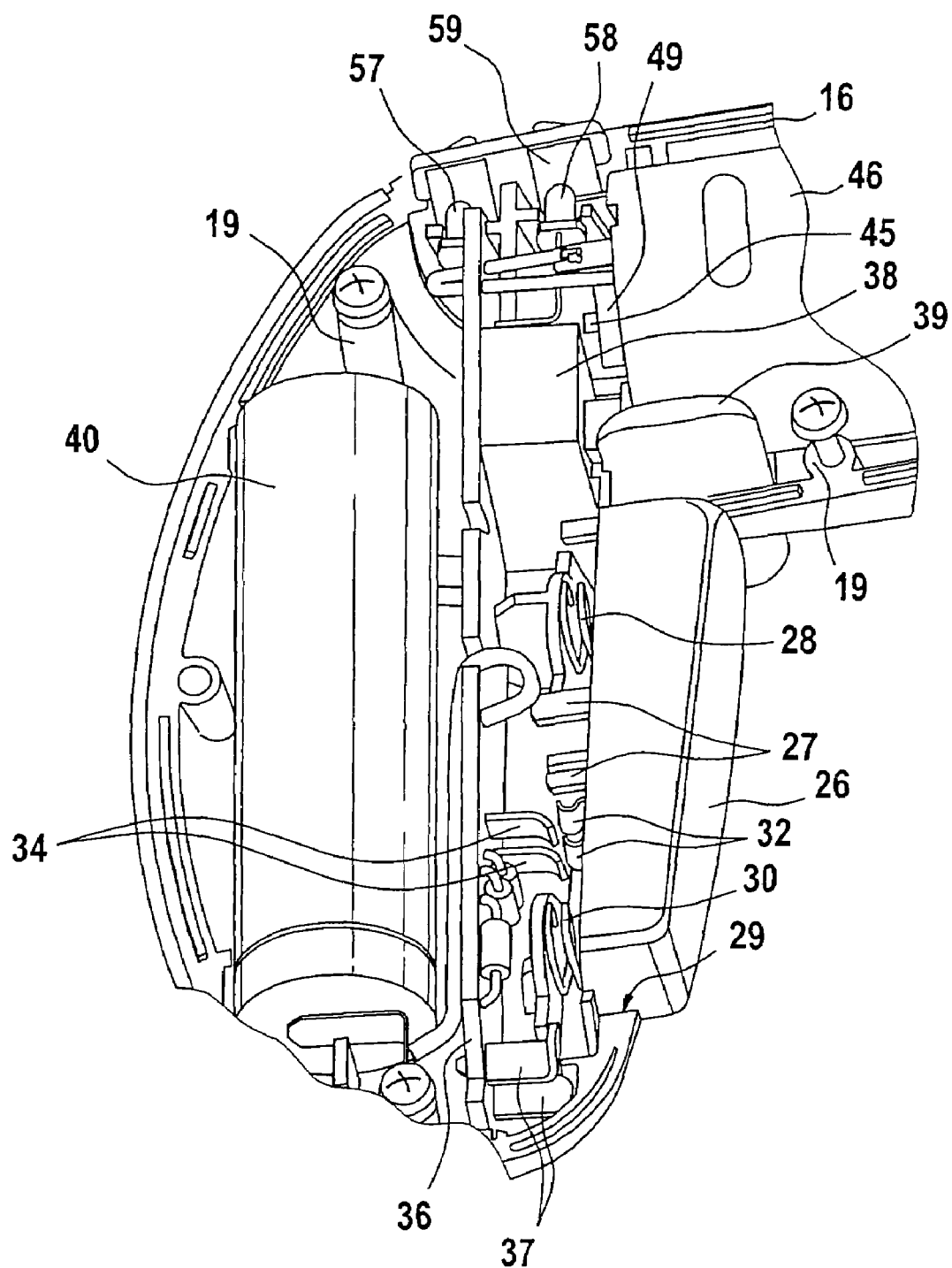
FIG. 4 shows an enlarged detail of the contact button from FIG. 1.

FIG. 4 shows an enlarged detail of the first casing half 16 with the inserted individual parts from FIG. 1, clearly showing the design of the rechargeable battery 40 with the adjacent parts and the circuit board 36 with the components fastened to it and the on/off button 26.

Figure 5:
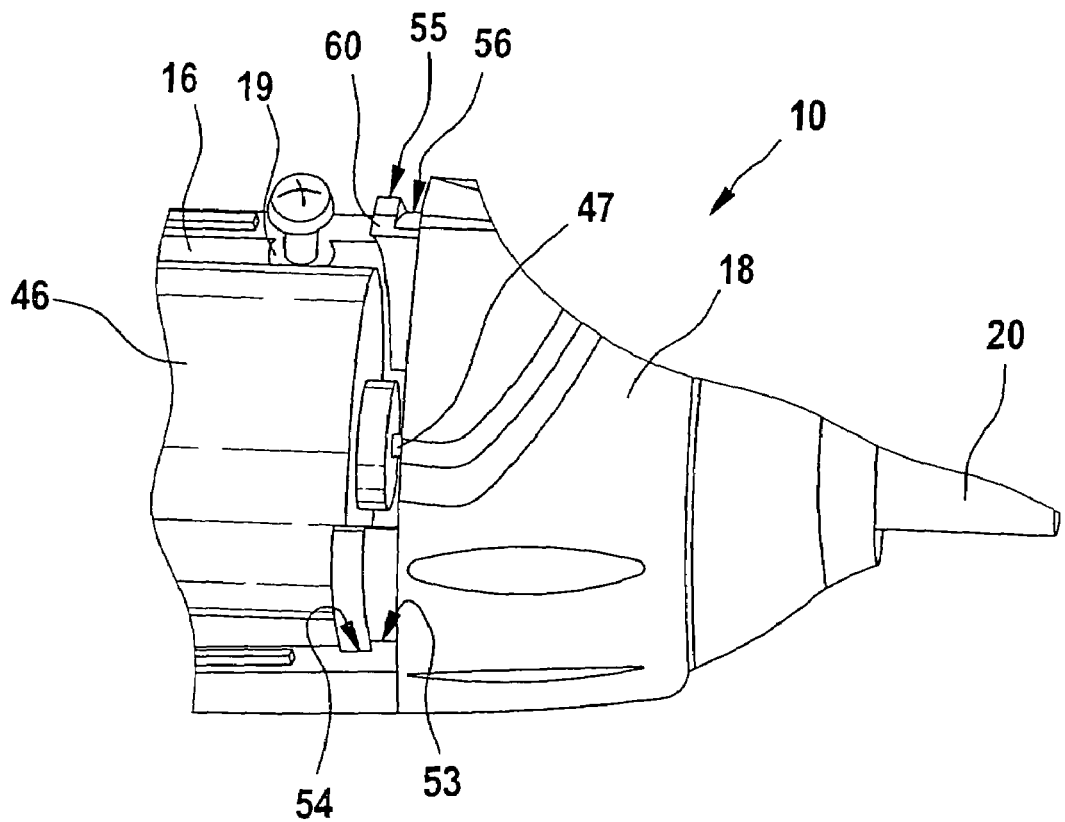
FIG. 5 shows an enlarged detail of the transmission housing from FIG. 1.

FIG. 5 shows an enlarged detail of the front region of the cordless screwdriver 10, with the lower casing half 16, looking toward the motor 46 and the transmission housing 18, which are inserted into it in a form-locked manner.

Figure 6:
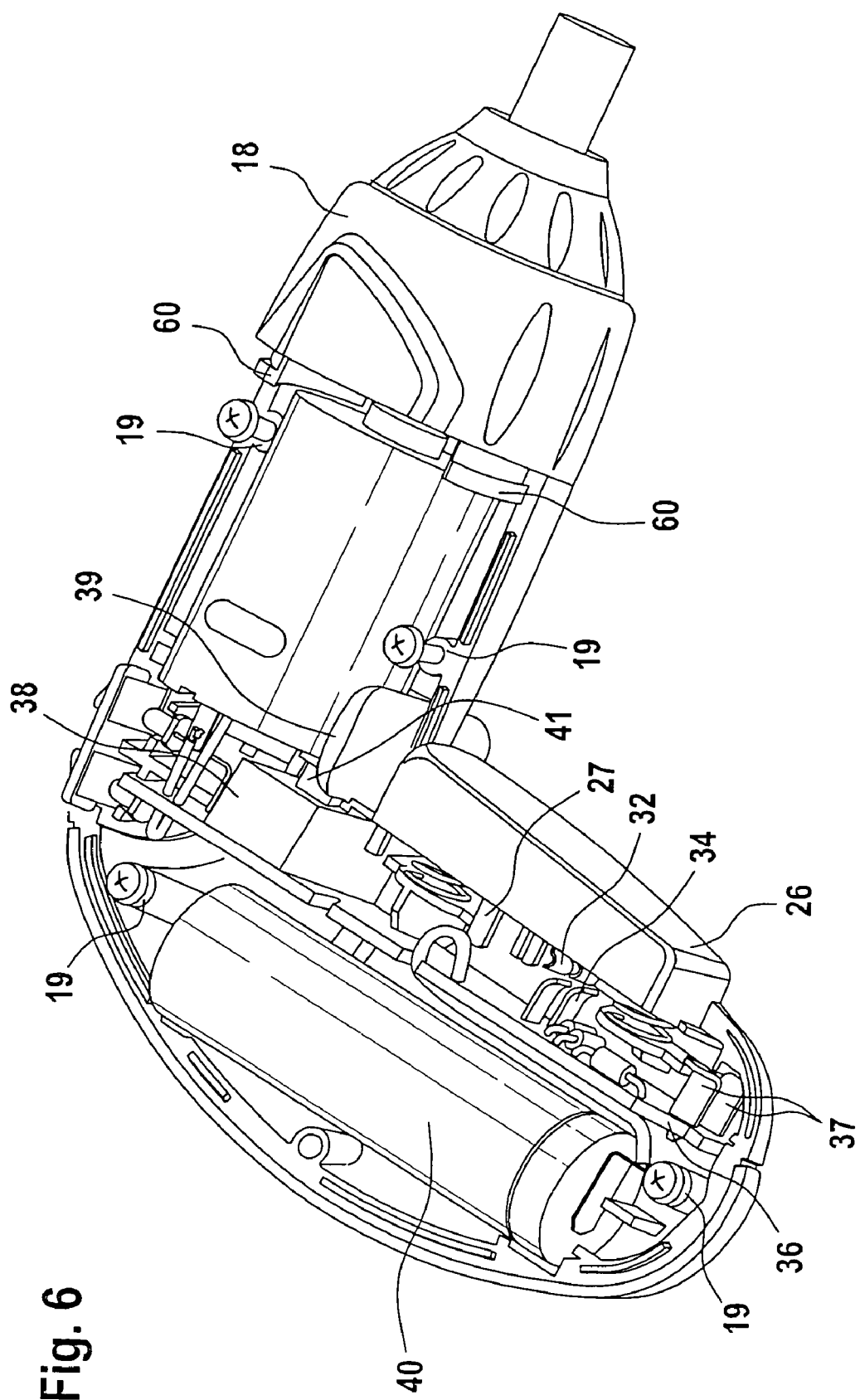
FIG. 6 is a slightly rotated view according to FIG. 1.

FIG. 6 is a perspective view according to FIG. 1, with the corresponding details from FIG. 1, this time also clearly showing the sliding pushbutton 39 for reversing the rotation direction, which in its middle position, also serves as a switch-on safety lock for the actuation of the on/off button 26. In this position, an undesired activation is not possible, for example when transporting the tool in a pants pocket.

Figure 7:
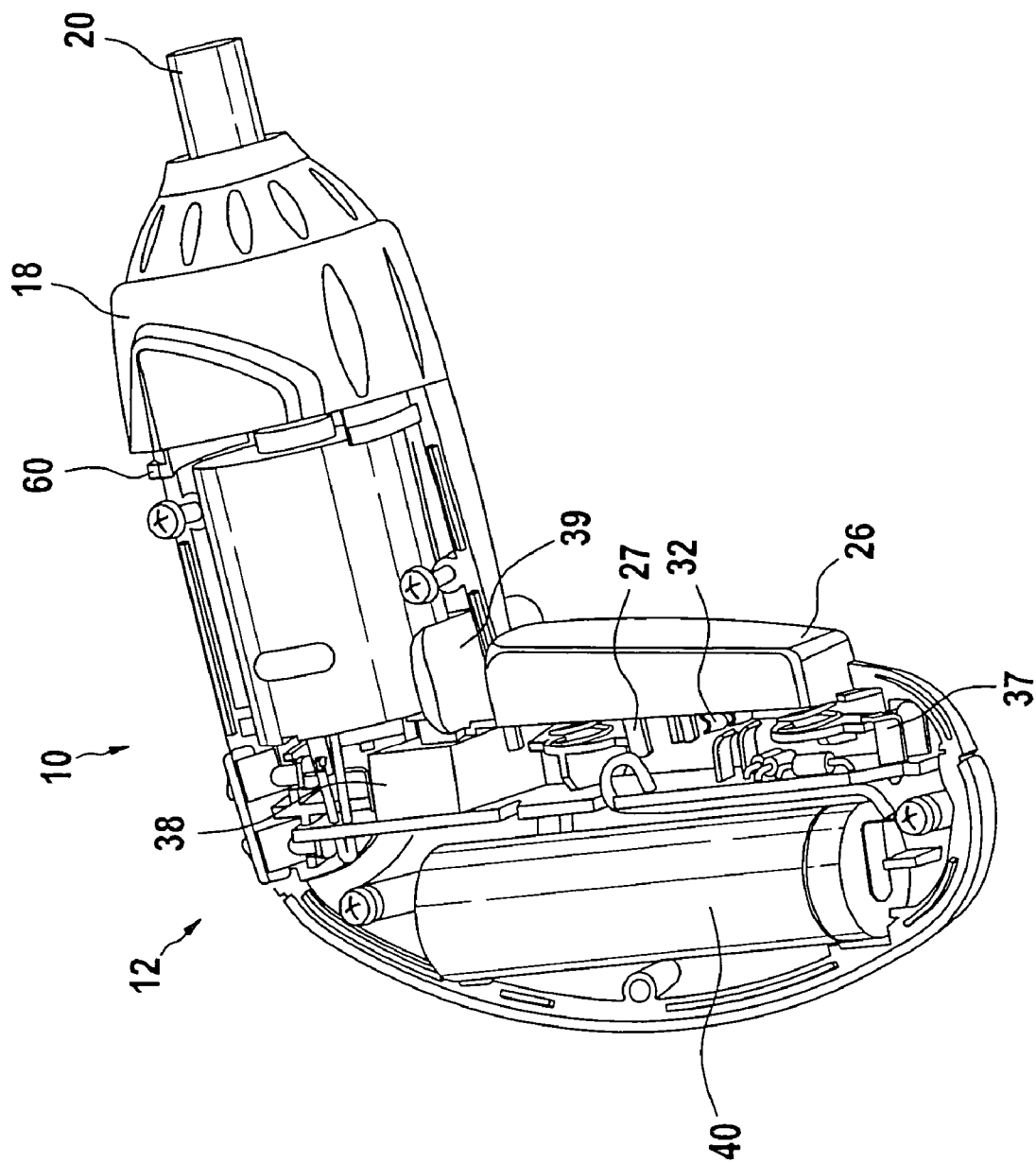
FIG. 7 is a slightly rotated view according to FIG. 6.

FIG. 7 is another three-dimensional view according to FIGS. 1 and 6; the details described with reference to these figures need not be repeated, but this figure is intended to improve comprehension of them.

Figure 8:
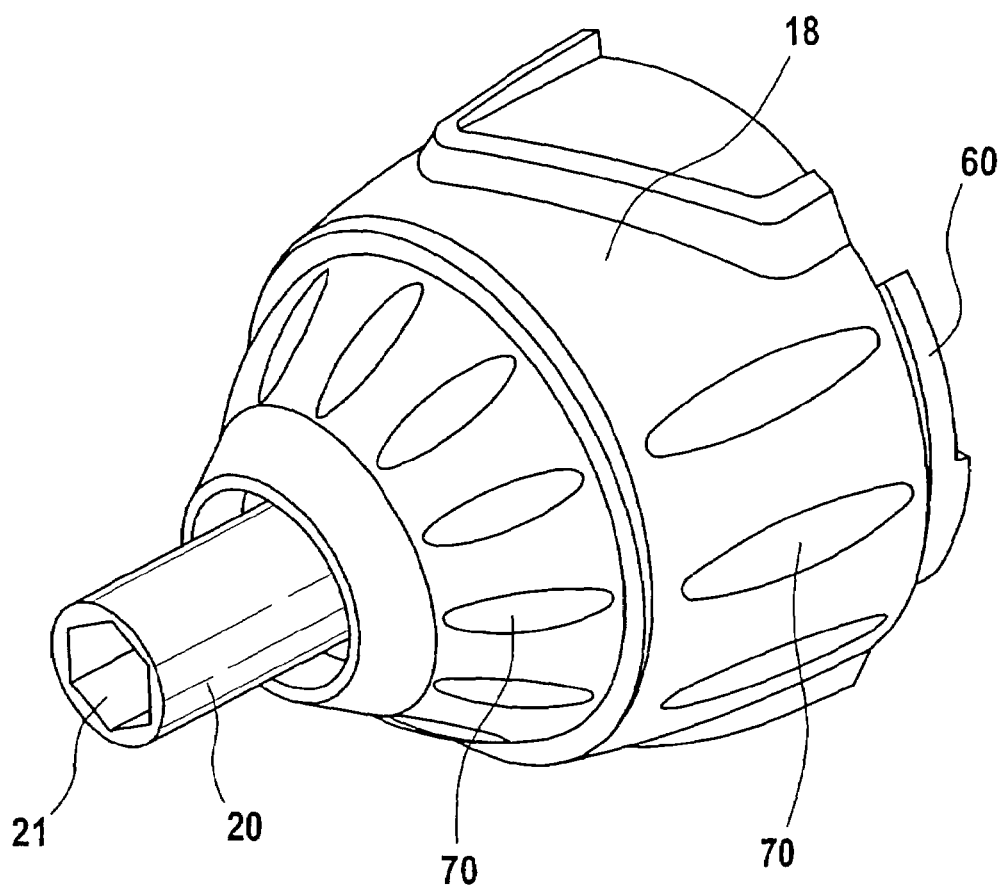
FIG. 8 is a three-dimensional front view of the transmission housing.

FIG. 8 is a detail view of the end of the transmission housing 18 with an installed transmission 65 and the output shaft 20 with the hex socket 21 protruding from the front and the axial extensions 60 protruding toward the rear; regularly spaced oval recesses 70 on the outside of the transmission housing 18 make it easier to grasp.

Figure 9:
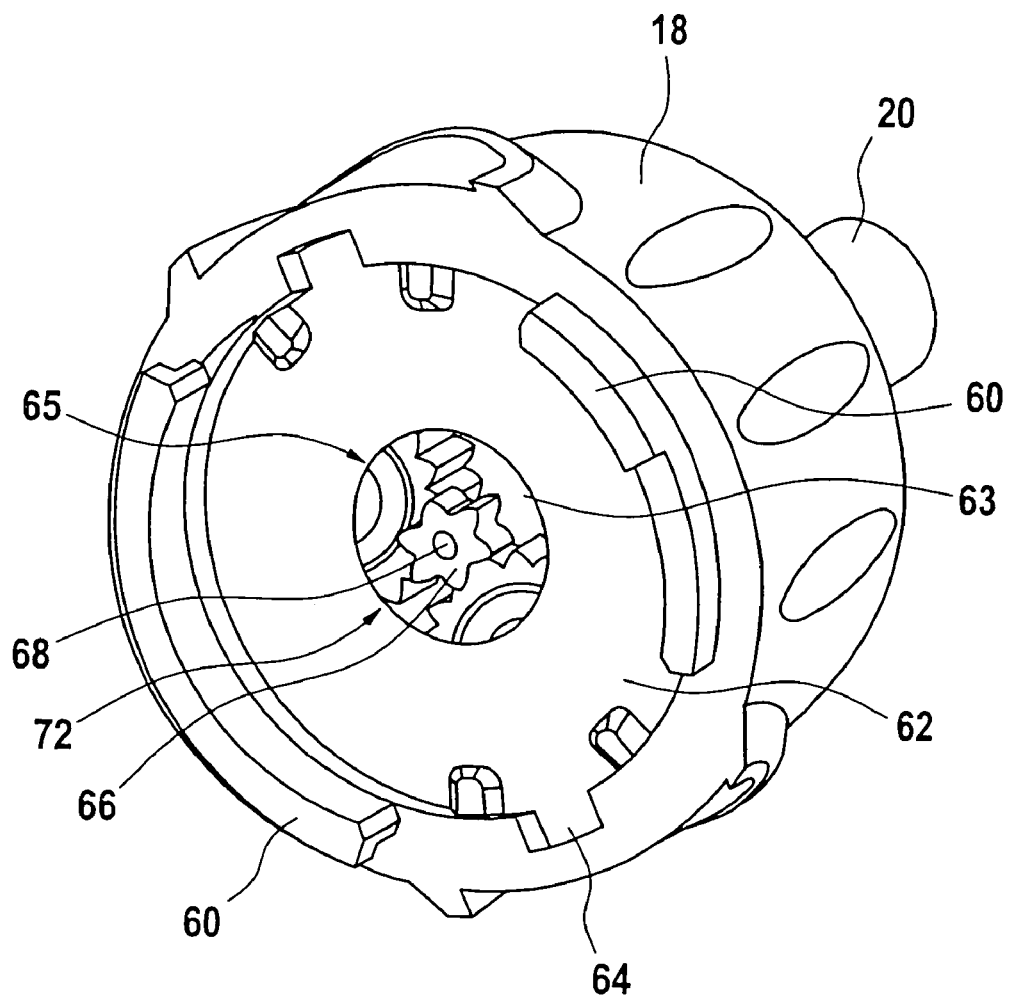
FIG. 9 is a three-dimensional rear view of the transmission.

FIG. 9 is a rear view of the transmission housing 18 according to FIG. 8, which is cylindrical at the back, showing the two axial extensions 60 and the spaces between them, as well as a spring washer 62 that has a central opening 63 and is mounted inside the transmission housing 18, extending over its entire inner diameter.

The spring washer 62 has radially protruding wings 64 by means of which it can be inserted in bayonet fashion into corresponding recesses in the circumference of the rear end of the transmission housing 18 and, by being turned and/or caulked, can engage therein.

The input shaft 66 of the transmission 65 can be accessed through the central opening 63 to produce the engagement with the motor shaft 47 and can be coupled to its flattened end so that it can be reliably driven to rotate. The input shaft 66 has a central recess 68 that constitutes the negative form of the flattened end of the motor shaft 47.

Figure 10:
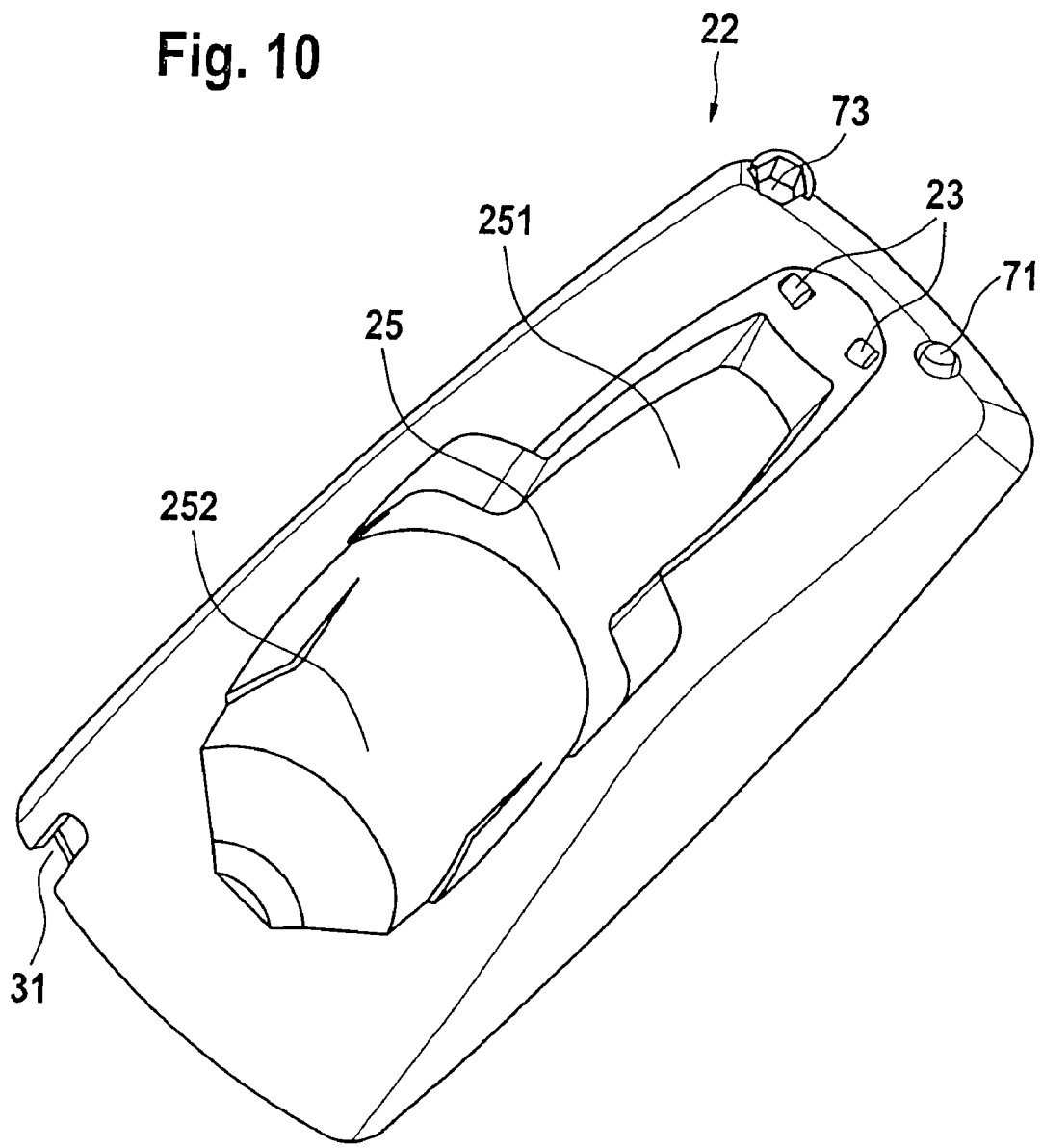
FIG. 10 is a three-dimensional top view of the charging cradle.

FIG. 10 is a top view of the charging cradle 22, showing the bed 25 that is divided into a handle bed 251 and a transmission housing bed 252 so that the cordless screwdriver 10 can be inserted precisely and almost without play into the charging cradle 22 in a clear, foolproof manner so that it rests there securely and its charging contact tabs 37 (FIGS. 1, 2, 4, 6, 7) reliably contact the charging contacts 23 of the charging cradle 22.

What is claimed is:

1. A cordless screwdriver with a charging cradle assembly comprising, the cordless screwdriver including a housing, a handle, charging contact tabs, and an output spindle; and the rechargeable battery having charging contacts, the cordless screwdriver and the rechargeable battery being configured so that the cordless screwdriver as a whole being placeable onto the charging cradle which automatically initiates a charging mode and in the charging mode being positioned on the charging cradle so that the housing of the cordless screwdriver is inclined relative to a horizontal plane and an end of said output spindle points downward.

2. A cordless screwdriver with a charging cradle assembly as defined in claim 1, wherein said handle is angled relative to said housing in pistol fashion.

3. A cordless screwdriver with a charging cradle assembly as defined in claim 1, wherein said housing and said handle are configured so that in the charging mode said housing and said handle are received in the charging cradle.

4. A cordless screwdriver with a charging cradle assembly as defined in claim 1, wherein said handle is configured so that in the charging mode it protrudes out from the charging cradle to permit a hand to easily grasp said handle from underneath and/or reach all the way around it in order to remove the cordless screwdriver.

5. A cordless screwdriver with a charging cradle assembly as defined in claim 1, wherein said handle has lateral slots, said charging contact tabs protruding outwards through said lateral slots for engagement with charging contacts of the charging cradle without requiring an attachment of a separate cable or a plug connector.

6. A cordless screwdriver with a charging cradle assembly as defined in claim 5, wherein said housing with said handle are composed of two casting halves which are joined to each other along a central plane, each of said slots and a recess surrounding said slots being situated in one of said casting halves and spaced equidistantly apart from said central plane.

7. A cordless screwdriver with a charging cradle assembly as defined In claim 1, wherein said handle has recesses configured so that in the charging mode the cordless screwdriver rests with said recesses in said handle so as to cover charging contacts of the charging cradle and by engaging over the charging contacts is secured against an undesired detachment from the charging cradle.

8. A cordless screwdriver with a charging cradle assembly as defined in claim 1, wherein the charging cradle has a top provided with beds for accommodating the cordless screwdriver and corresponding to an imprint of outer surfaces of an inner angle enclosed by said handle and said housing, which said housing is composed of a motor housing and a transmission housing, at least one of the beds extending at an inclination of less than 90°.

9. A cordless screwdriver with a charging cradle assembly as defined in claim 1, wherein said charging cradle has a bed in which said handle protrudes in wedge fashion with only its on/off button and said handle itself protrudes from the charging cradle and is only minimally inserted into said bed.

10. A cordless screwdriver with a charging cradle assembly as defined In claim 1, wherein the cradle is formed so that it is placeable in a stable fashion on a flat supporting surface without having to mount the charging cradle in place or hold it when removing the cordless screwdriver.

11. A cordless screwdriver with a charging cradle assembly as defined in claim 10, wherein the charging cradle is configured so that it is placeable in a stable fashion on the flat supporting surface which is a horizontal supporting surface.

12. A cordless screwdriver with a charging cradle assembly as defined in claim 1, and further comprising an on/off button which extends over substantially an entire length of said handle and with an actuating stroke of 1-5 mm is actuatable to switch on at any point along its length.

13. A cordless screwdriver with a charging cradle assembly as defined in claim 12, wherein said on/off button is configured so that it is actuatable with the short actuation stroke of 2 mm.

14. A cordless screwdriver with a charging cradle assembly as defined in claim 1, wherein said housing has casing halves; and further comprising a circuit board for accommodating electrical contacts and control elements and extending lengthwise in said handle so as to be held in clamp fashion by said casting halves of said housing and to stiffen said housing.

15. A cordless screwdriver with a charging cradle assembly as defined in claim 1, wherein said housing is composed of casing halves, said handle on each side of said casing half having a rubber covering that covers a large area, bulges outward, and is provided with a nubbed structure.

16. A cordless screwdriver with a charging cradle assembly as defined in claim 1, wherein said housing has a motor housing and a transmission housing, said handle, said motor housing and said transmission housing being configured so that they are receivable in the charging cradle to be held in the charging cradle during the charging mode.

17. A cordless screwdriver with a charging cradle assembly as defined in claim 1, wherein said housing has a motor housing and a transmission housing, said motor housing and said transmission housing being configured so that they are receivable in the charging cradle to be held in the charging cradle during the charging mode.

18. A cordless screwdriver and a charging cradle assembly as defined in claim 1, wherein said handle of said cordless screwdriver Is angled relative to said housing in pistol fashion and configured so that in the charging the mode when said cordless screwdriver as a whole is placed onto the charging cradle, said housing and said handle of said cordless screwdriver are inclined at different opposite angles relative to the horizontal plane.

* * * * *